United States Patent [19]

Townsend, Jr.

[11] 3,827,589
[45] Aug. 6, 1974

[54] CARRIER APPARATUS FOR MOTOR VEHICLES

[76] Inventor: Warren R. Townsend, Jr., 1200 96th Ave., Zeeland, Mich. 49464

[22] Filed: Oct. 19, 1971

[21] Appl. No.: 190,482

[52] U.S. Cl. .............................. 214/450, 214/85.1
[51] Int. Cl. .............................................. B60r 9/00
[58] Field of Search ....... 214/450, 85, 85.1; 296/60, 296/61; 224/42.1 E

[56] References Cited
UNITED STATES PATENTS

| | | | |
|---|---|---|---|
| 3,260,929 | 7/1966 | Hedgepeth | 224/42.1 E |
| 3,352,440 | 11/1967 | Wilson | 214/85 |
| 3,527,371 | 9/1970 | Townsend | 214/450 |
| 3,612,366 | 10/1971 | Schneider | 214/450 |

*Primary Examiner*—Robert J. Spar
*Assistant Examiner*—John Mannix
*Attorney, Agent, or Firm*—McGarry & Waters

[57] ABSTRACT

A snowmobile carrier for automobiles, the carrier having a support deck including a central trackway and a pair of lateral trackways disposed on either side of the central trackway for receiving and supporting the runners of a snowmobile. The support deck is pivotably mounted at the lower end to the bumper of the auto. Central support means are secured to a central portion of the support deck and extend downwardly to rest between the rear window and trunk of the auto. The support deck is releasably secured through straps and the like at its upper end to the automobile to prevent shifting of the carrier on the auto. A special folding ramp is supported in folded position at the side of the support deck and engages the bottom portion of the support deck in unfolded position for loading and unloading of the snowmobile. The pivotable mounting means between the bottom of the support deck and the bumper includes an annular receiving ring secured to the bumper and a pair of unequal length pins engaging the rings for ease in loading of the carrier onto the auto. Further, the central support means for the carrier is adjustable vertically to adapt the carrier to cars of different shapes.

9 Claims, 6 Drawing Figures

PATENTED AUG 6 1974 3,827,589

CARRIER APPARATUS FOR MOTOR VEHICLES

BACKGROUND OF THE INVENTION

1. Field of the Invention

This invention relates to carriers for automobiles. In one of its aspects, the invention relates to a snowmobile carrier for automobiles having an improved ramp and mounting means for adapting the ramp to automobiles of different shapes and sizes.

2. State of the Prior Art

In my U.S. Pat. No. 3,527,371, there is described and claimed a snowmobile carrier for automobiles, the carrier being pivotably mounted onto the back bumper of the auto through a pair of U-shaped plates. The carrier has a ramp which is slidably mounted beneath the carrier deck for loading and unloading of the snow machine. The carrier deck is hinged at a central portion for folding about the hinge. The disclosed carrier has some limitations insofar as adaptability to automobiles whose back ends differ substantially in size and shape. Further, collection of ice and snow between the ramp and the carrier deck may hinder the movement of the deck beneath the support deck.

BRIEF STATEMENT OF THE INVENTION

I have discovered an improved carrier in which the carrier is more adaptable to different shaped vehicles and is more easily attached and mounted onto the automobiles. In addition, the carrier provides a new ramp whose operation is not hindered by ice and snow accumulation.

According to the invention, the snowmobile carrier has a generally rigid support deck including a central trackway for receiving and supporting the drive means of a snowmobile, and a pair of lateral trackways disposed on either side of the central trackway for receiving and supporting the runners of the snowmobile. The lower portion of the deck is rotatably mounted onto the rear bumper of an automobile through a pair of annular receiving members having a shaft extending through and secured to the bumper. A pair of laterally extending pins on vertical support members fixed to a lower portion of the support deck engage the annular receiving members for rotatably supporting the support deck at the rear portion of the automobile. Preferably, the vertical support members are adjustably secured to a guide member so that the position of the lower portion of the ramp with respect to the bumper is adjustable. The pins engaging the annular receiving members are of different length so that the longer pin can first engage one of the annular members and thereby guide the other pin into engagement with the other annular member as the support deck is moved laterally with respect to the bumper during loading of the support deck onto the automobile. Adjustable supports are provided at a central portion of the support deck for supporting the support deck above the auto between the rear window and the trunk.

A foldable ramp is releasably secured to a side of the support deck for storage purposes. The ramp is positioned at a bottom portion of the support deck and secured thereto by laterally extending pins in the unfolded condition for loading and unloading of the snowmobile.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
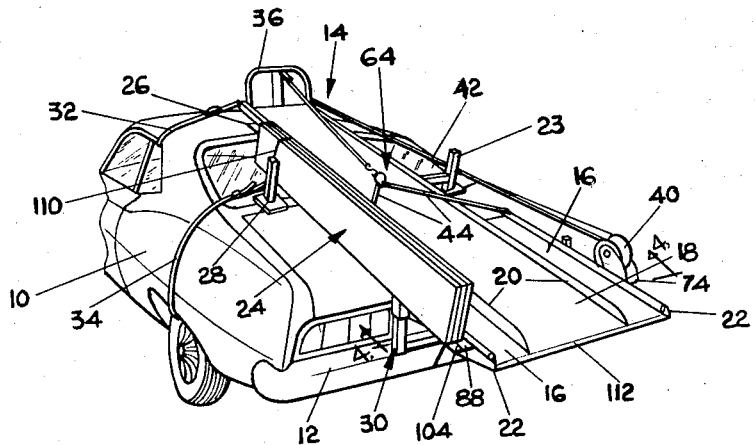
FIG. 1 is a perspective view of the carrier according to the invention mounted on the back portion of an automobile.

Referring now to the drawings, there is shown a snowmobile carrier mounted on the rear portion of an automobile 10 having a rear bumper 12. The snowmobile carrier comprises a support deck 14 including lateral trackways 16 flanking a central trackway 18. Rails 20 divide the lateral trackways 16 from the central trackway 18. Further, upstanding side rails 22 are provided at the edges of the lateral trackways 16. A folding ramp 24 is stored at one side of the carrier as illustrated in FIG. 1 and unfolds to provide a mounting ramp between the ground and the bottom of the snowmobile carrier.

As illustrated in FIG. 1, the ramp for the snowmobile is inclined downwardly and rearwardly with respect to the automobile 10. The ramp has a pad 26 secured beneath the upper portion of the support deck 14, the pad 26 resting on the roof of the automobile just above the rear window. A pair of adjustable central supports 28 are secured to the sides of the support deck 14 at central portions thereof and rest on the automobile 10 between the trunk and rear window thereof. A pair of adjustable bumper supports 30 are secured to a lower end portion of the support deck 14 and are rotatably mounted above the bumper 12 of the automobile.

Adjustable anchor straps 32 having clips or hooks on the ends are secured at one end to the upper end of the central trackway 18 and engage the rain gutter of the automobile above the rear window at the other end to prevent lateral shifting of the carrier on the automobile. A second pair of adjustable anchor straps 34 are secured at one end to the central supports 28 and at the other end engage the edge of the wheel well or fender, the second pair of anchor straps 34 further stabilizing the carrier on the automobile.

Figure 2:
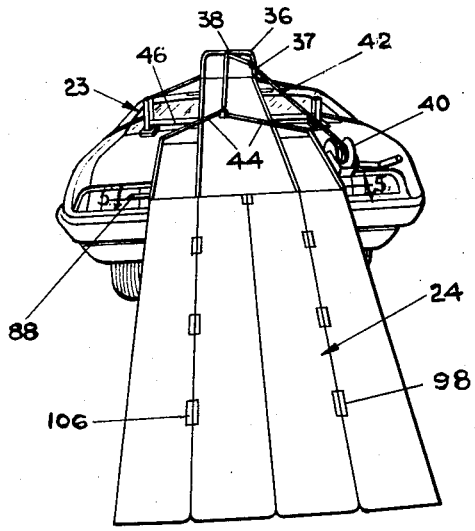
FIG. 2 is a rear view of the carrier illustrating the ramp in the loading position.

A bracing element 36 extends upwardly from the upper end or forward end of the support deck and mounts a pulley wheel 38. A second pulley wheel 37 is mounted at the right side of the bracing element (FIG. 2). A winch 40 is mounted at one edge of the support deck 14 and winds a pulley rope 42 for loading and unloading the snowmobile with the assistance of the pulley wheels 38 and 37. Attaching ropes 44 are secured to the upper portions of the side rails 22 for engaging and retaining the snow machine when mounted on the support deck. The pulley rope 42 extends from the winch 40 through pulley 37, through pulley 38 and then down the support deck 14. The end of the pulley rope 42 is secured to the rear end of the snow machine and the winch draws the snow machine up the ramp backwards. The rope is ordinarily tied to the snow machine while the snow machine is supported on the support deck and aids in holding the snow machine on the support deck. To this end, the winch has conventional locking means (not shown) such as a rachet mechanism to lock the rope 42 in any given position. The locking means is releasable so that the winch can lower the snow machine down the ramp during unloading of the snow machine.

Figure 3:
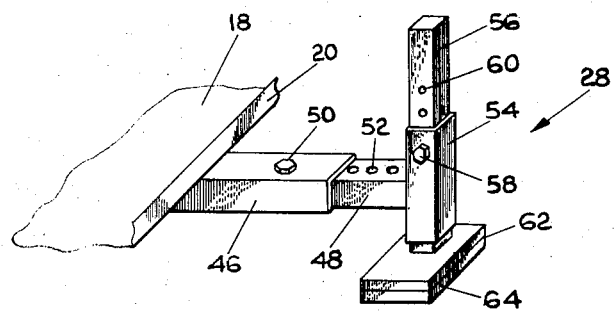
FIG. 3 is an enlarged partial view showing an adjustable central support for the carrier.

Reference is now made to FIG. 3 for a detailed description of one of the adjustable central supports 28. A horizontal tubular support 46 extends beneath the central trackway 18 and is secured thereto such as by welding. The tubular support 46 is hollow and telescopingly receives a tube 48 having a plurality of holes 52 in the tube 48 to firmly secure the tube 48 to the tubular support 46. The tube 48 is thus adjustable with respect to the support 46 by removing bolt 50.

The tube 48 is welded to an upright tubular member 54 which is hollow to slidably receive a vertical tubular support member 56 having adjustment holes 60. A bolt 58 extends through the tubular member 54 and through the support member 56 for securing the support member fixed with respect to the tubular member 54. Support plate 62 is secured to the bottom of the support member 56 and mounts a resilient pad 64.

With the configuration illustrated in FIG. 3, the carrier apparatus is adapted to mount on any type of automobile, regardless of the shape thereof. The lateral position of the pads on the automobile can be adjusted by removing bolt 50 and sliding the tube 48 with respect to the tubular support 46. When the proper lateral position of the pad 64 is reached, the bolt 50 is replaced and the tube 48 is once again fixed with respect to these tubular supports 46. The vertical position of the support deck 14 is similarly adjusted with respect to the pad 64 which rests between the back window and trunk of the automobile. The adjustment is made by removing bolt 58 and sliding the support member 56 with respect to the upright tubular member 54 until a proper relationship is reached between the support deck and the automobile portion between the rear window and the trunk. The bolt 58 is then replaced, thereby fixing the relationship between the tubular member 54 and the support member 56.

Desirably, the structure illustrated in FIG. 3 is provided on each side of the support deck 14, it being understood that the structure on the other side of the support deck (not shown in FIG. 3) would be a mirror image of that illustrated in FIG. 3.

Figure 4:
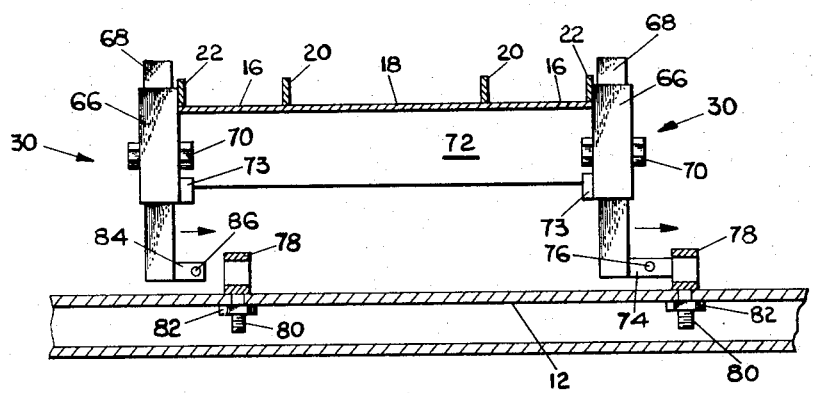
FIG. 4 is an enlarged sectional view seen generally along lines 4—4 of FIG. 1, illustrating the manner in which the carrier is loaded onto the automobile.

Reference is now made to FIG. 4 for a detailed description of the adjustable bumper supports 30 and for a discussion of the manner in which the carrier is rotatably secured to the bumper 12 of the automobile. Each of the bumper supports 30 comprises a hollow tubular member 66 and an upright support 68 which slides within the tubular member 66. The upright support 68 contains a plurality of laterally extending holes (not shown) for receiving a bolt 70 which extends through the tubular member 66 and the upright support 68 for fixing the relationship between the annular member 66 and the support 68. The vertical relationship between these two members can be adjusted by removing bolt 70 and sliding the upright support 68 with respect to the tubular member 66. The tubular members 66 are joined through a cross brace 72 which is welded or otherwise suitably fastened to the tubular members 66. The cross brace 72 is also secured to the bottom portion of the deck 14 by welding or other suitable fastening means.

Figure 6:
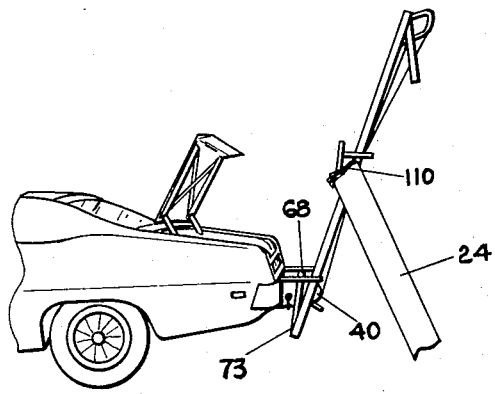
FIG. 6 is a side view of the carrier illustrating the manner in which the carrier is pivotable to permit access to the automobile trunk.

An elongated support pin 74 having a hole 76 extends laterally from the bottom portion of the upright support 68. Similarly, a shorter support pin 84 having a hole 86 extends laterally in the same direction from the bottom of the other of the upright supports 68. A pair of annular rings 78 have depending threaded shafts 80 which extend through a hole in the bumper 12. The annular rings 78 are secured to the bumper 12 by nuts 82 which engage the threaded shafts 80. The very base of the deck 14 is braced by members 73 which extend between the tubular member 76 and the very bottom end of the deck 14 (see FIG. 6).

The manner in which the deck is mounted onto the bumper 12 is illustrated in FIG. 4. Initially, the support deck 14 is positioned on the automobile such that the central supports 28 are positioned between the rear window and the trunk of the auto with the pad 26 resting on the roof. The bottom of the deck is positioned so that the pins 74 and 84 are aligned with the rings 78. The bottom of the deck is manuvered until the longer pin 74 engages the ring 78 and the deck is then moved laterally so as to insert the pin 74 into the ring 78. With the lateral movement, the pin 84 will be guided into the ring 78 on the left side of the bumper. Because pin 74 is longer than pin 84, only pin 74 need be aligned with the rings 78 and inserted into the ring 78. Once the longer pin 74 is guided into the ring 78, it will help guide the pin 84 into the other ring 78. The unequal length of the pins 74 and 84 eliminate the difficult task of trying to align both pins simultaneously with the support rings 78. Loading of the carrier onto the automobile can procede much faster with the unequal length pins. Once the pins 74 and 84 have been received completely by the annular rings 78, self-locking pins (not shown) or other suitable fastening means are inserted through the holes 76 and 86 to hold the pins 74 and 84 from lateral movement with respect to the annular rings 78.

Figure 5:
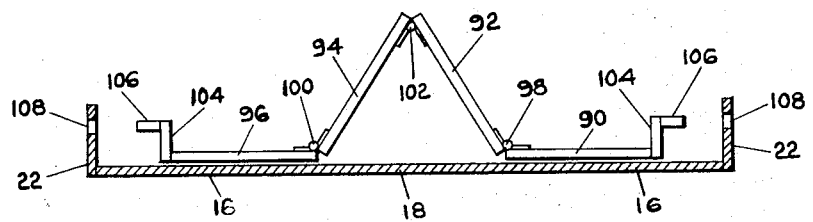
FIG. 5 is an enlarged sectional view seen along lines 5—5 of FIG. 2 illustrating the manner in which the ramp is adjusted into loading position.

Referring now to FIGS. 1, 2 and 5, the operation and the construction of the folding ramp 24 will be described in detail. The ramp 24 is comprised of elongated ramp slats 90, 92, 94, and 96. The slats 90 and 92 are hinged together through hinges 98. The slats 94 and 96 are hinged together through hinges 100 and the slats 92 and 94 are hinged together through hinges 102. The hinges permit the slats to fold in an accordian-like or ziz-zag manner as illustrated in FIG. 5 and FIG. 1. Normally, the ramp is stored at one side of the support deck 14 as illustrated in FIG. 1. For this purpose, a support plate 88 having a pair of holes therein extends laterally from a bottom portion of the support deck 14 at the left side thereof as seen in FIG. 1. Slats 90 and 96 have attached to one end thereof plates 104 which are perpendicular to the plane of the slats. The plates 104 extend slightly beyond the ends of the slats. A pin 106 projects perpendicularly outwardly from each of the plates 104. In the stored position, the pins 106 project through the holes in the support plate 88 with the plates 104 resting on the plate 88. The other end of the folded ramp 24 rests on the tubular support 46 or member 48 and is secured in place on the tubular support through a flexible strap 110. The vertical support member 56 maintains the folded ramp in the vertical position.

When the snow machine is to be loaded onto the support deck 14 or unloaded therefrom, the folding ramp 24 is removed from the side of the support deck 14 and positioned at the bottom of the support deck as illustrated in FIG. 2. To accomplish this result, the ramp 24 is turned around so that the pins 106 are positioned adjacent the bottom of the support deck and the other end of the support deck 14 for supporting the top of the ramp 24 (FIG. 1). The ramp is positioned on the apron 112 in the partially folded position as illustrated in FIG. 5. The ramp is then unfolded with the pins 106 engaging the holes 108 in the side rails 22 when the ramp 24 is completely flat as illustrated in FIG. 2. The snow machine can then be easily pulled up in the ramp with the aid of the winch 40 or lowered down the ramp from the support deck 14.

After the ramp has been used, the ramp is refolded in accordian manner as illustrated in FIG. 5 and replaced on the side of the ramp in the storage position illustration in FIG. 1.

The mounting of the carrier on the back of the car permits rapid and easy access to the trunk of the car. To accomplish this, the anchor straps 34 and 32 are removed and the support deck 14 can then be easily pivoted about pins 74 and 84 to the position illustrated in FIG. 6. At this point, the ramp 24, removed from its storage position, can be used to brace the ramp in the position illustrated in FIG. 6. To this end, the ramp is merely positioned between the tubular support 46 and the ground to retain the ramp in the bracing position. Once the pins 84 and 74 are positioned securely within the annular rings 78, a locking pin is placed in the holes 86 and 76 respectively to securely retain the pins 74 and 84 within the rings 78.

The vertical adjustability of the supports 30 and 28 permits universal use of the carrier on most makes of automobile. This universal use is also promoted by the lateral adjustability of the central supports 28. The simplified mounting of the lower supports 30 to the bumper 12 provides a rapid means of mounting the carrier onto the automobile. Further, the annular rings at the bumper provide a simple and universal means of coupling the carrier to the automobile. The foldable ramp is simple and very effective in loading of the snowmobile and is free from problems associated with ice and snow accumulation.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. In a snowmobile carrier for automobiles and the like, said carrier comprising:
   a generally rigid support deck including a central trackway for receiving and supporting the drive means of a snowmobile, a pair of lateral trackways disposed on either side of said central trackway for receiving and supporting the runner means of the snowmobile;
   mounting means at a lower end portion of said deck for rotatably attaching said support deck to the rear bumper of said automobile;
   means at a central portion of said support deck for supporting said support deck between the rear window and the trunk of said auto; and
   means at an upper portion of said deck to restrain lateral movement of said support deck on said auto;

the improvement which comprises:
      said rotatable attaching means including first and second annular members having a shaft extending through said bumper and means securing said annular members to said bumper;
      vertical support members secured to said lower end portion of said support deck at either side thereof, each of said vertical support members having a laterally extending pin received within said annular members, said pins being of different length so that in loading said carrier onto said auto, the longer of said pins first engages the annular member and the lateral movement of said carrier guides the other of said pins into engagement with the other annular member; and
      means retaining said laterally extending pins within said annular members.

2. A snowmobile carrier according to claim 1 and further comprising a guide member secured to said lower end portion of said support deck at either side thereof, said vertical support members being slidably positioned within each of said guide members, and means adjustably securing said vertical support members to said guide members, whereby said lower end of said support deck can be vertically adjusted with respect to said bumper.

3. In a snowmobile carrier for automobiles and the like said carrier comprising:
   a generally rigid support deck including a central trackway for receiving and supporting the drive means of a snowmobile, a pair of lateral trackways disposed on either side of said central trackway for receiving and supporting the runner means on the snowmobile;
   mounting means at a lower end portion of said deck for rotatably attaching said support deck to the rear bumper of said automobile;
   means at a central portion of said support deck for supporting said support deck between the rear window and the trunk of said auto; and
   means at upper portion of said deck to restrain lateral movement of said support deck on said auto;
   the improvement which comprises:
      a ramp for loading a snowmobile onto said support deck, said ramp having means for releasably engaging a lower portion of said support deck, said ramp comprising a plurality of elongated slats extending the longitudinal extent of said ramp and hinge means between said slats permitting folding of said ramp with respect to each other; and means for releasably supporting said ramp in folded condition at one side of said support deck, said releasable supporting means including a support plate having a plurality of holes therein and secured to one side of said support deck, said ramp having at one end pins projecting outwardly of the sides of said ramp when unfolded and extending parallel to each other from a folded edge of said ramp when said ramp is folded, said pins engaging said holes in said support plate when said ramp is in folded condition and stored at the side of said support deck.

4. A snowmobile carrier according to claim 3 wherein there are four such slats and said slats are folded in an accordion-like manner.

5. A support deck according to claim 3 wherein said engaging means on said ramp comprise a pair of holes at the sides of said support deck, said pins engaging said holes as said ramp is unfolded in position at the bottom portion of said support deck.

6. In a snowmobile carrier for automobiles and the like, said carrier comprising:
   a generally rigid support deck including a central trackway for receiving and supporting the drive means of a snowmobile, a pair of lateral trackways disposed on either side of said central trackway for receiving and supporting the runner means of the snowmobile,
   mounting means at a lower end portion of said deck for rotatably attaching said support deck to the rear bumper of the automobile,
   means at a central portion of said support deck for supporting said support deck between the rear window and the trunk of said auto, and
   means at an upper portion of said deck to restrain lateral movement of said support deck on said auto;
   the improvement which comprises:
   said support means at said central portion of said support deck comprising horizontal support members secured to said deck and extending from each side of a central portion thereof, a vertical central support secured to the outer end of each of said horizontal support members, said vertical central supports being vertically adjustable to adjust the position of said deck with respect to the central portion of said vehicle, and means on each of said horizontal supports for adjusting the lateral position of said vertical central supports with respect to said deck to compensate for cars of different width and shapes.

7. A snowmobile carrier according to claim 6 wherein said adjustable means comprise guide members fixed to the sides of said support deck; vertical support members slidable within said guide members and means for releasably securing said support members in given positions within said guide members.

8. A snowmobile carrier according to claim 6 wherein said mounting means at said lower end of said support deck are adjustable to provide still greater flexibility in adapting said carrier to different autos.

9. A snowmobile carrier according to claim 8 and further comprising support means at an upper portion of said carrier to rest said carrier on the roof of said auto.

* * * * *